United States Patent [19]

Berman et al.

[11] E Re. 29,275

[45] Reissued June 21, 1977

[54] MOTOR CONTROL SYSTEM

[76] Inventors: Herbert Berman, 1018 Beacon St.; Stanley N. Tenen, c/o Dr. Herbert Berman, 1018 Beacon St., both of Brookline, Mass. 02146

[22] Filed: June 9, 1975

[21] Appl. No.: 585,082

Related U.S. Patent Documents

Reissue of:

[64] Patent No.: 3,849,709
Issued: Nov. 19, 1974
Appl. No.: 354,355
Filed: Apr. 25, 1973

[52] U.S. Cl. ..... 318/227; 318/230; 318/231; 318/313; 318/415

[51] Int. Cl.[2] ..... H02P 5/40

[58] Field of Search ..... 318/227, 230, 231, 313, 318/415

[56] References Cited

UNITED STATES PATENTS

| | | | |
|---|---|---|---|
| 3,374,410 | 3/1968 | Cronquist et al. | 318/415 X |
| 3,416,057 | 12/1968 | Froyd et al. | 318/231 X |
| 3,512,067 | 5/1970 | Landau | 318/227 |
| 3,514,685 | 5/1970 | Burgess | 318/313 |
| 3,518,516 | 6/1970 | Pawletko | 318/415 X |
| 3,593,083 | 7/1971 | Blaschke | 318/231 X |
| 3,700,989 | 10/1972 | Jensen | 318/230 X |
| 3,719,873 | 3/1973 | Graf | 318/227 |

*Primary Examiner*—Gene Z. Rubinson

*Attorney, Agent, or Firm*—Charles Hieken; Jerry Cohen

[57] ABSTRACT

A two-phase motor preferably of the induction or hysteresis type is driven from a variable frequency clock circuit by energizing the motor windings in phase quadrature over the frequency range. Speed control is provided by mechanically modulating a light emitting diode (LED) and photoresistor combination that couples to the clock circuit for determining its frequency of operation. The output of the clock circuit in turn couples to a two-phase generator that drives output bridges associated with the motor in phase quadrature. The photo resistor is characterized by a relatively [lone] *low* "off" (return to dark resistance) time constant that provides automatic braking when the speed control is set to zero. The system further includes a feedback circuit responsive to motor load fluctuations sensed by monitoring the DC current drawn by output bridge circuit means associated with the motor for controlling the frequency of operation of the clock circuit. This clock control permits the motor to come up to speed quite quickly with little or no synchronous slippage.

If a load which would ordinarily stall the motor at the speed indicated by the mechanical control is [ the speed ] *placed* on the motor the feedback circuit will slow the clock control so that the motor will run at a speed lower than the mechanically indicated speed rather than stall.

10 Claims, 4 Drawing Figures

MOTOR CONTROL SYSTEM

Matter enclosed in heavy brackets [ ] appears in the original patent but forms no part of this reissue specification; matter printed in italics indicates the additions made by reissue.

FIELD OF THE INVENTION

The present invention relates in general to a motor control system or circuit for use with many different types of motors including conventional AC and DC motors. More particularly, this invention is concerned with an improved motor control circuit which is preferably for use with a multi-phase induction motor. Although, the preferred embodiment of this invention shows an induction motor, the concepts of this invention can be used with other motors such as squirrel cage or permanent magnet rotor types. The improvement in accordance with the present invention is concerned with braking control means and a novel feedback means. The principles of the present invention are applicable in many different types of motor control environments especially those requiring a wide speed operating range.

BACKGROUND & OBJECTS OF THE INVENTION

Representative prior art patents showing motor control systems and circuits include U.S. Pat. Nos. 3,571,681; 3,518,516; and 3,411,058. Typical prior art systems have certain drawbacks relating in general to the speed control for the motor. For example, when the speed control is set initially at an intermediate or high speed setting, many times, due to cold bearings or an existing overload, the motor does not start. The initial reaction on the part of the operator is to set the speed indicator still higher. This, however, compounds the problem. Some systems overcome this problem inefficiently by supplying increased current to the motor windings. For applications requiring low power drain this is an obvious disadvantage. Other systems require that the motor be modified such as by adding additional windings or optical or magnetic sensing means to determine motor speed. This would of course, increase the cost of the overall system. In accordance with the present invention, it is thus an object to provide an improved speed control wherein the motor can be brought up to speed quite rapidly without excess power drain and without initial stalling or synchronous slippage. In the present invention the motor is controlled from a variable oscillator and the clock frequency of the oscillator is controlled in accordance with the current delivered to the motor windings. Thus, initially as the speed control is quickly increased, (too quickly to maintain synchronous speed), the winding current increases and this indication is fed back to the clock circuit or oscillator to effectively slow down the clock thus enabling the rotor to come up to speed more rapidly without any loss of synchronism. In effect, the system of this invention is a torque regulator with a desired maximum speed as permitted by the torque requirements.

Another disadvantage that is inherent in some control circuits or systems is that there is no braking action provided when the operator returns the speed control to its low or zero setting. When the motor has been operated at high speed and with a normal relatively light load, it takes 10–20 seconds for the motor to coast to a stop.

Accordingly, it is an object of the present invention to provide a motor control system wherein there is provided an electronic braking action when the speed control returns to its zero.

Another object of the present invention is to provide a motor control system wherein the motor can be of conventional design without a need for modifying the motor such as by adding extra windings or employing photo cell or magnetic detectors.

SUMMARY OF THE INVENTION

To accomplish the foregoing and other objects of this invention there is provided a motor control system which generally comprises an electric motor preferably of the multiple phase type having a plurality of separately energized field windings and a variable frequency oscillator or clock circuit. The rotor of the motor may be squirrel cage (induction) or permanent magnet (hysteresis) type. In accordance with one feature of the present invention, there is provided a feedback means coupling preferably from the output bridge means of the motor to the oscillator. This feedback means is responsive to the current flowing in the windings, to in turn control the frequency of the oscillator. The frequency is controlled inversely with respect to the current supplied to the output bridges associated with the windings so that as the current attempts to too rapidly increase, especially when the motor is initially started, the clock frequency is restrained so as not to override synchronous speed thereby providing more rapid starting.

In accordance with another aspect of the present invention there is provided speed control means which in a preferred embodiment includes a light emitting diode, a photo resistor and modulating means disposed intermediate the diode and resistor. In order to provide the braking action the photo resistor is specifically selected to have a relatively long "off" time constant (return to dark resistance). The system also includes a two-phase generator having an input bias line controlled from the speed control means. Because of the relatively long time constant of the photo resistor, the two-phase generator reaches a point in time where only one phase is operating its associated output bridge thereby causing a "pegging" or braking action of the motor. Thus, if the modulating means is suddenly placed in the position of total darkness, the motor is gradually walked down by the phase generator and then "pegged" to a stop.

BRIEF DESCRIPTION OF THE DRAWINGS

Numerous other objects, features and advantages of the invention should now become apparent upon a reading of the following detailed description taken in conjunction with the accompanying drawings, in which.

DETAILED DESCRIPTION

Figure 1:
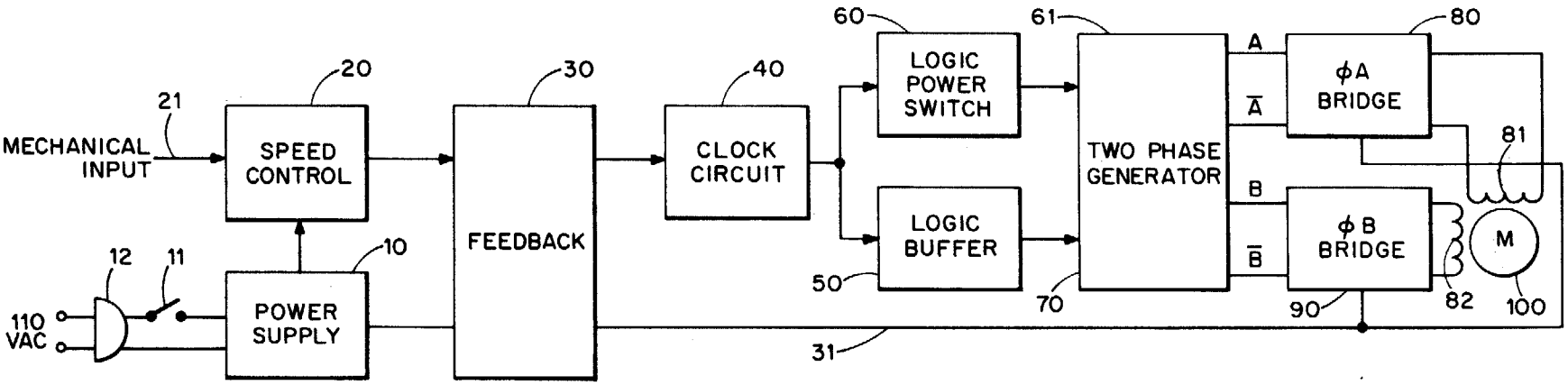
FIG. 1 is a block diagram of a motor control system constructed in accordance with the principles of the present invention.

FIG. 1 is a block diagram of a motor control system of the present invention. The system includes a power supply 10 coupled by way of switch 11 and plug 12 from a conventional 110 VAC power line. The power supply 10 may be of conventional design and preferably provides a plurality of different voltage levels one of which is shown coupled to speed control box 20. Other lines which are not shown in FIG. 1 couple from the power supply to the other blocks in FIG. 1.

The speed control 20 couples by way of feedback block 30 to clock circuit 40. The speed control box 20 includes a mechanical input line 21 which is a preferred embodiment includes a modulating shutter mechanism. The speed control 20 and feedback 30 are essentially in series and both effect the operating frequency of clock circuit 40. The operation of the feedback block 30 is discussed in more detail hereinafter.

The output of clock circuit 40 is a clock output which couples to logic buffer 50 and logic power switch 60. Logic buffer 50 may simply include one drive transistor and the output of logic buffer 50 couples to two-phase generator 70 for controlling the basic operation of this generator. The logic switch 60 also receives the clock signal from circuit 40 and the output of switch 60 provides a biasing level on line 61 for controlling the operation of generator 70.

Figure 3:
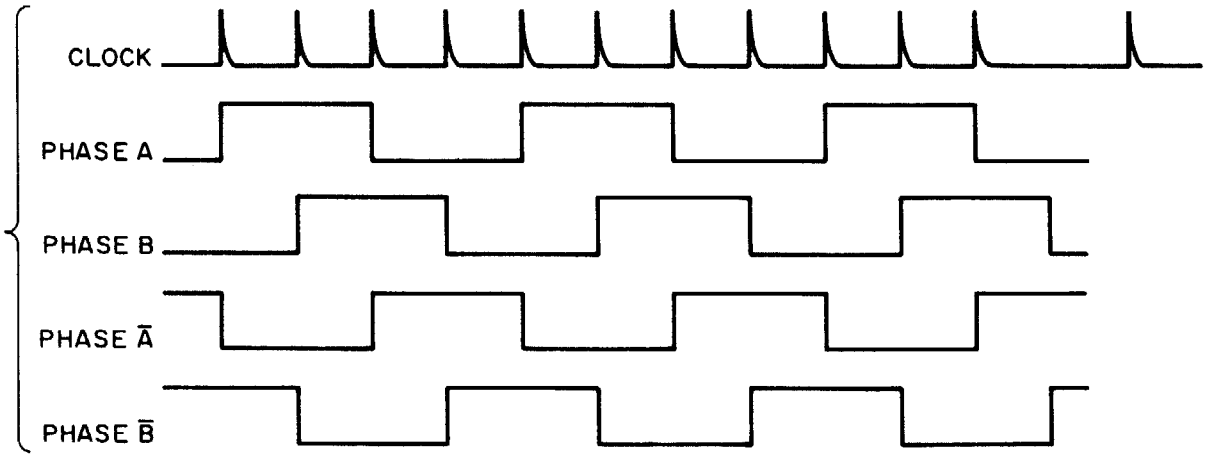
FIG. 3 shows waveforms associated with the circuit diagram of FIG. 2.

The output of the generator 70 includes four square-wave signals displaced in phase quadrature. In FIG. 1 these signals are shown as the phase A and $\bar{A}$ and phase B and $\bar{B}$ signals. FIG. 3 shows these phase quadrature waveforms and a typical clock output.

The phase A and phase B signals are coupled to bridge circuits 80 and 90. The bridge circuits in turn drive field windings 81 and 82, respectively. These field windings are associated with motor 100.

Figure 2:
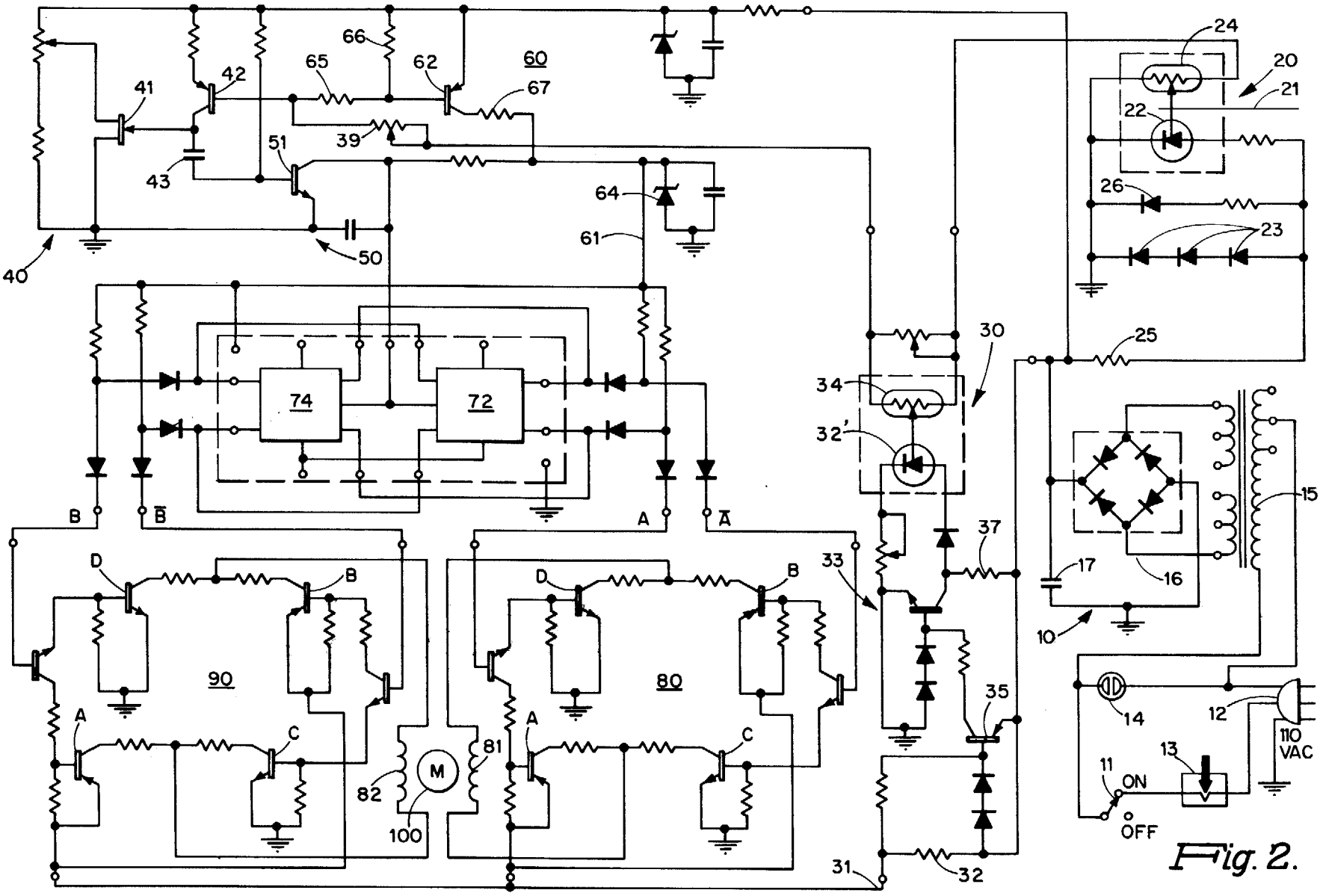
FIG. 2 is a detailed circuit diagram for one embodiment of the system shown in FIG. 1.

In accordance with one aspect of the present invention there is provided a feedback line 31 coupled from both of bridge circuits 80 and 90 to feedback block 30. When the speed control 20 is initially rapidly increased to an intermediate or high setting the impedance of the bridge circuits decreases and thus the current on line 31 sensed by feedback block 30 increases. The feedback circuit responds by decreasing the output frequency of circuit 40. This initially slows down the two-phase generator and permits the motor 100 to come up to speed more rapidly without any appreciable synchronous slippage. In FIG. 2 there is shown a circuit diagram of a preferred embodiment of a motor control system of this invention. Like reference characters have been used in FIGS. 1 and 2 to identify the same general components of the system.

The power supply 10 is of conventional design and may include a circuit breaker 13 coupled between the input plug 12 and the power switch 11. A neon pilot light 14 may also be coupled across the 110 VAC. This voltage is coupled to transformer 15 and the secondary winding of the transformer couples to full wave rectifier bridge 16. A capacitor 17 of fairly high value couples across the output of bridge 16. In the embodiment shown in FIG. 2 a step-down transformer is used and the voltage developed across capacitor 17 is typically 30 VDC. This voltage is coupled to clock circuit 40, logic power switch 60, and feedback circuit 30. This voltage is also coupled by way of sensing resistor 32 of the feedback circuit via feedback line 31 to the output bridges 80 and 90.

In the preferred embodiment the speed control circuit 20 includes light emitting diode (LED) 22 and associated photo resistor 24. The mechanical shutter 21 is disposed between diode 22 and resistor 24 for modulating the light transmitted from the diode to the resistor. See FIG. 4 for the characteristic of the resistor 24. The speed control 20 includes a relatively small power supply comprised of three diodes 23 and resistor 25 which couples from the diodes to the plus 30 VDC line. A bias voltage of approximately 2 volts is thus provided across LED 22. The speed control 20 may also include another LED pilot light 26.

The photo resistor 24 of speed control 20 has one side tied to ground and the other side coupled to feedback circuit 30. As previously indicated the feedback circuit includes a sensing resistor 32. This circuit also includes an LED 32 and associated photo resistor 34 along with an amplifier circuit 33 which controls the output illumination of LED [ 32 ] *32'*. Circuit 33 includes transistors 35 and 36 and associated diodes and biasing resistors. The collector of transistor 36 couples by way of resistor 37 to the plus 30 VDC line and also to LED 32.

At initial motor start-up when the shutter 21 is set at some intermediate or high speed level the current in line 31 increases. An increased voltage drop occurs across resistor 32 which in turn causes transistors 35 and 36 to conduct more current. Because transistor 36 and LED 32 are essentially in parallel an increase in conduction through transistor 36 causes a corresponding decrease in the current through LED [ 32 ] *32'*. This in turn causes the resistance of photo resistor 34 to increase which in turn causes the clock circuit 40 to have a lower frequency output. The immediate feedback action by way of two-phase generator 70 and the output bridge circuits enables the motor to come up to speed quicker. As this occurs, the current sensed on line 31 tends to decrease and the feedback action by way of circuit 30 provides an increase in the output frequency of clock circuit 40.

The output of feedback circuit 30 couples by way of resistor 39 which is a low speed setting, to clock circuit 40. Circuit 40 generally includes unijunction transistor 41, bipolar transistor 42 and timing capacitor 43. In the embodiment of FIG. 2 the logic buffer 50 includes only a single transistor 51 which actually forms an integral part of the clock circuit 40.

The clock circuit is of substantially conventional design and operates so that the capacitor 43 is cyclically charged by way of transistor 42. During the charging cycle the unijunction transistor 41 will conduct at some point and capacitor 43 will discharge through the unijunction transistor. The capacitor discharge is effectively amplified by transistor 51 and the collector of transistor 51 is a pulse signal that is coupled to the generator 70.

The pulse output from logic buffer 50 has a repetition rate that is dependent upon the value of capacitor 43 and of a total resistance including potentiometer 39 and photo resistors 24 and 34. When this total resistance is at its high level the output of the oscillator is at a low frequency and the motor is thus operating at slow speed. Alternatively, when the total resistance is relatively small the clock frequency is high and the motor is operating at a higher speed.

As previously mentioned, there is also a second input by way of line 61 from the logic power switch 60 to generator 70. The logic power switch basically comprises a bipolar transistor 62, associated resistors and Zener diode 64. Resistors 64 and 66 provide a voltage divider with the common junction between these two resistors coupled to the base of transistor 62. When the speed control is at a usual intermediate setting, current is flowing through resistor 66 and transistor 62 is in its conductive state. The main current flows through transistor 62 and resistor 67 and from there through Zener diode 64. The Zener diode when properly driven establishes a voltage of approximately plus 5 VDC on line 61.

When the speed control is turned to a low setting or turned off transistor 62 tends to decrease in conduction and at some point the voltage across the Zener diode can no longer be maintained and thus the voltage on line 61 decreases. At some point, generator 70 no longer has sufficient bias voltage by way of line 61 and eventually the output of the generator 70 stops. The operation of the logic power switch and generator 70 as the speed control is reduced is discussed in more detail hereinafter. As previously indicated the clock signal is coupled from the collector of transistor 51 to generator 70. Generator 70 includes a pair of bistable circuits 72 and 74. The clock input couples to the triggering input of each of the bistable circuits 72 and 74. These bistable circuits 72 and 74 function as phase A and phase B flipflops, respectively. These flipflops are so connected that their states compliment sequentially. The outputs are thus in time quadrature. The four outputs from generator 70 are the waveforms as depicted in FIG. 3. FIG. 3 also shows the clock waveform.

Bridge circuits 80 and 90 comprise like circuits in which first the A and B transistors are conductive and then the C and D transistors are conductive in response to signals from two-phase generator 70, thereby driving windings 81 and 82 with rectangular pulses in time quadrature. A feature of this circuitry is that the peak-to-peak voltage across the motor windings is approximately twice the DC potential available from the DC supply. Resistors prevent the windings from drawing excess current that might cause damage to the transistors.

Regarding again the feedback circuit 30 this circuit is responsive to the current flowing in line 31 which current is an indication whether the motor is straining at initial starting. For example, when the motor and its associated bearings are cold or if there is an abnormal load on the motor many times it will not start when the speed control is set to a high speed due to the low torque available under the initially extreme synchronous slippage condition. Under these conditions the clock is effectively running at its maximum frequency, the motor is stalled and there is insufficient torque available in order to reach a synchronous speed. The armature dithers or spins at very low torque at a subharmonic of the clock frequency. Also, it is possible to stall the motor under heavy load conditions when the motor is restrained below synchronous speed. Accordingly, one feature of the present invention is the feedback circuit which senses this initial condition. If the motor is not starting the impedance of the windings decreases and thus the current fed through resistor 32 increases. The feedback circuit responds as previously discussed by increasing the resistance of photo resistor 34 thereby decreasing the clock speed permitting the motor to reach synchronism.

Figure 4:
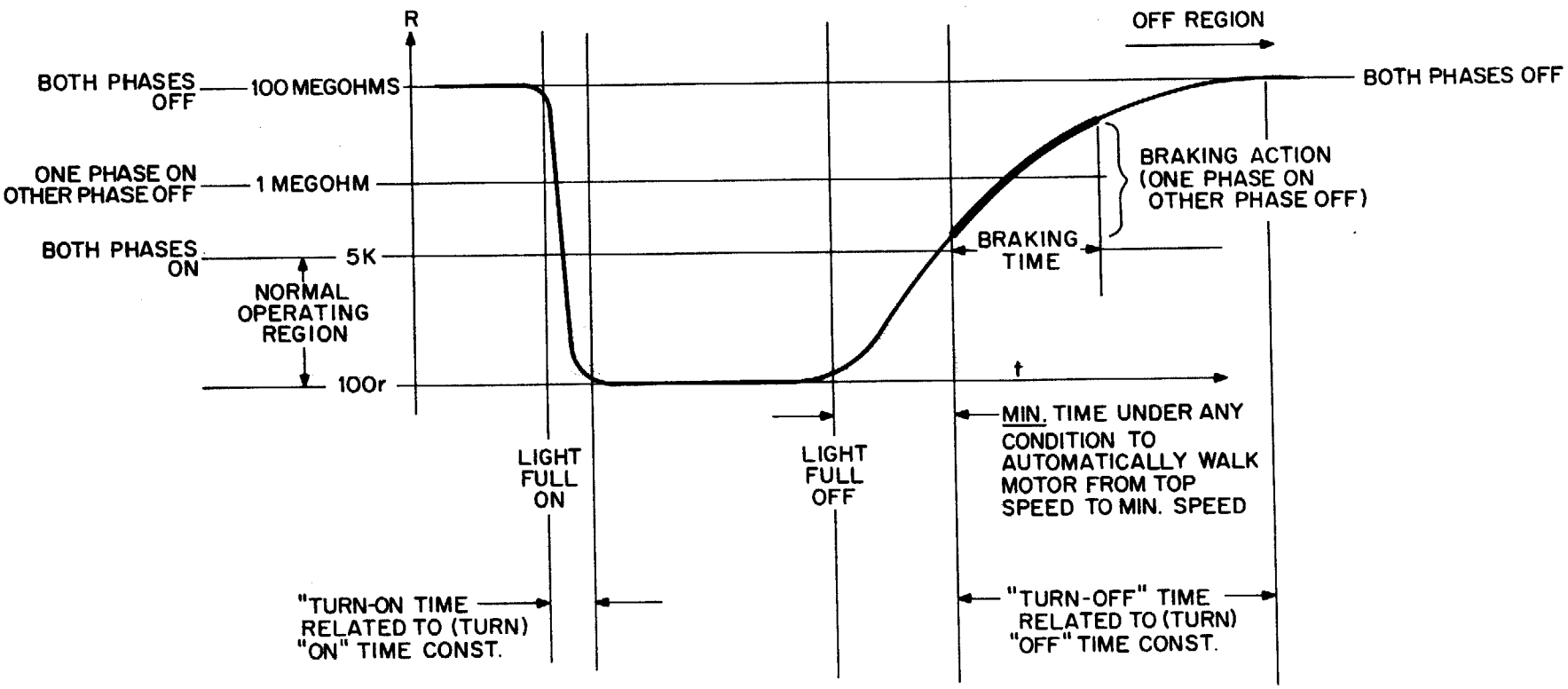
FIG. 4 is a plot of resistance v. time for the speed control photo resistor of FIG. 2.

Another feature of the present invention is concerned primarily with photo resistor 24, as it functions in the disclosed embodiment in conjunction with logic power switch 60 and generator 70. It has been found advantageous to select a particular photo resistor 24 having a relatively long "off" time constant. FIG. 4 shows a plot of resistance for a photo resistor 24 v. time. It is preferred to select a photo resistor having a time constant on the order of 1.0 seconds or greater. By making such a selection there is provided in this motor control circuit an automatic braking of the motor.

It is also preferred that a lead selenide or lead sulfide photo resistor be used. These types typically have both "on" and "off" time constants in the range of 10–1,000 milliseconds. For the present invention, photo resistors having an "off" time constant closest to 1,000 milliseconds (1.0 seconds) are preferred.

Referring to FIG. 4 there is shown a resistance v. time plot indicating also some of the terms used herein. In this plot it can be seen that the turn-on time is typically shorter in duration than the turn-off time. The "off" time constant relates to the turn-off time and may be defined as approximately two-thirds of the time it takes to go from the on time resistance (100 Ohms) to the off time resistance (10–100 Megohms).

The operation of the circuit of FIG. 2 is now discussed in association with the plot of FIG. 4. Initially shutter 21 blocks all light to resistor 24, the resistance is at its high level of say 100 Megohms and the oscillator is not operating (both phases A and B inoperative). The speed control is set at zero.

If it is assumed that the speed control is instantaneously set to its high speed setting; then the resistance of resistor 24 decreases. When the resistance reaches say 1 Megohm, one of the phases is operating the other is not. At a resistance of 5 Kohms both phases are operating. The logic power switch 60 controls phase operation via line 61. The normal operating range is between 100 Ohms and 5 Kohms.

When the speed control is subsequently turned to its zero setting, the resistance of resistor 24 increases over a longer time period as represented by the "off" time constant. The motor is gradually slowed initially automatically by gradually decreasing the frequency of operation of the oscillator. Transistor 62 of power switch 60 thus remains conductive but its conduction decreases and at some point in time, illustratively shown at about a resistance of 1 Megohm, the current delivered to Zener diode 64 is insufficient to maintain +5 volts across the Zener diode. The voltage on line 61 thus decreases. The flipflops 72 and 74 will generate their associated outputs when line 61 is at a sufficient positive level. However, as the voltage on line 61 decreases first one and then the other of the bistable device ceases generating output pulses. Because these devices are inherently not duplicates of each other in all characteristics it is assured that one of the bistable devices will cease operating before the other. This operation is desirable in that with only one of the bistable devices operating the already slowed motor tends to "peg" and slows rapidly to a stop. FIG. 4 shows the braking action region wherein only one phase is operating.

Having described one preferred embodiment for the control circuit of the present invention it should now be obvious that other arrangements can be conceived that fall within the spirit and scope of the present invention. For example, there has been disclosed herein one particular feedback circuit. However, there are many other embodiments of feedback circuits including those not using an LED diode that could provide the proper feedback compensation by monitoring the winding currents. Also, the LED in the speed control could be replaced by a potentiometer and an additional decay circuit could be provided essentially in place of the photo resistor to provide the appropriate decay voltage on line 61.

What is claimed is:

1. In a system for controlling a motor having at least one field winding and a variable frequency oscillator whose output controls motor speed, the improvement comprising speed control means coupled to said oscillator for controlling its output frequency, and including a light source a photo resistor and modulating means disposed intermediate said light source and resistor, said photo resistor characterized by a relatively long off or decay time constant as said photo resistor traverses from its low resistance to high resistance state.

2. The system of claim 1 wherein said decay time constant is on the order of 1.0 seconds or greater.

3. The system of claim 1 wherein said decay time constant is greater than 0.1 seconds.

4. The system of claim 1 wherein said photo resistor is of the lead selenide or lead sulfide type.

5. A system for controlling a multiple phase motor having a plurality of separately energizable field windings, said system comprising;

a variable oscillator, circuit means coupled from said oscillator and responsive to the frequency of operation of said oscillator for driving said field windings, said drive circuit means including bridge circuit means for providing pulses to the field windings at a repetition rate controlled by the frequency of operation of the oscillator, and a two-phase generator coupled intermediate the oscillator and bridge circuit means, power supply means providing a DC voltage for said drive circuit means, feed back means coupled from said power supply means to said drive circuit means for sensing fluctuations in the power drawn by said power supply means and having means for controlling the output frequency of said oscillator inversely with respect to the magnitude of the drawn power, said two-phase generator having one input coupled from said oscillator and a second input for establishing a bias level for said two-phase generator, and means coupled from said oscillator to said second input of said two-phase generator for establishing a predetermined bias level for said generator when said oscillator is operating above a predetermined frequency and reducing said biasing level to at least partially inhibit said generator when said oscillator is reduced in frequency below said predetermined frequency.

6. A system for controlling a motor having at least one field winding, said system comprising;

a variable oscillator, circuit means coupled from said oscillator and responsive to the frequency of operation of said oscillator for driving said at least one field winding, power supply means providing a DC voltage for said drive circuit means, and feed back means coupled from said power supply means to said drive circuit means for sensing fluctuations in the power drawn by said power supply means and having means for controlling the output frequency of said oscillator inversely with respect to the magnitude of the drawn power, said feedback means including variable resistance means wherein said resistance increases as said drawn power increases.

7. The system of claim 6 including variable resistance speed control means coupled in series with said variable resistance means, both said variable resistance speed control means and said variable resistance means coupling to said oscillator for controlling the operating frequency thereof.

8. The system of claim 7 wherein said variable resistance speed control means includes a light source and associated photo resistor.

9. The system of claim 7 wherein said variable resistance means includes a light source and associated photo resistor.

*10. Apparatus for controlling the speed of an AC motor having at least one field winding comprising,*

*a variable oscillator,*

*circuit means coupled from said oscillator and responsive to the frequency of operation of said oscillator for driving said at least one field winding with an AC signal of frequency determined by the frequency of operation of said oscillator,*

*power supply means providing a DC voltage for and delivering a DC current to said circuit means,*

*and feedback means coupled from said power supply and including means for sensing the DC power drawn from said power supply and having means for controlling the output frequency of said oscillator to be inversely proportional to the magnitude of the DC power drawn by said circuit means from said power supply means,*

*said means for sensing the DC power drawn from said power supply means comprising resistive means direct coupled to said power supply means and carrying said filtered DC current delivered by said power supply means to said circuit means for providing thereacross a proportional voltage drop as a control signal for controlling the output frequency of said oscillator to be inversely proportional to the magnitude of the DC power drawn by said circuit means from said power supply means.*

* * * * *